Oct. 30, 1951     W. A. MAHER     2,573,039
COMBINATION DRIP MOLDING AND MOUNTING BRACKET
FOR AUTOMOBILE VISORS
Filed Feb. 24, 1950
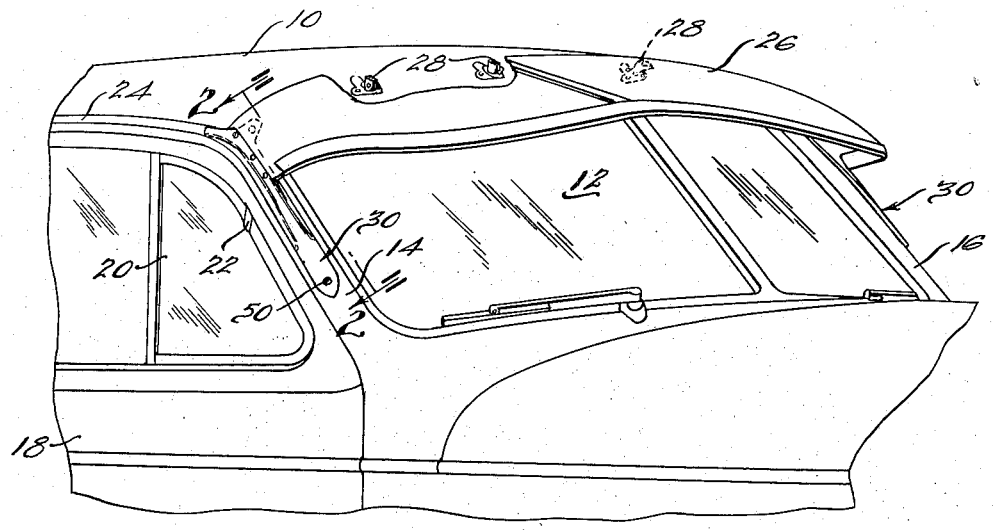
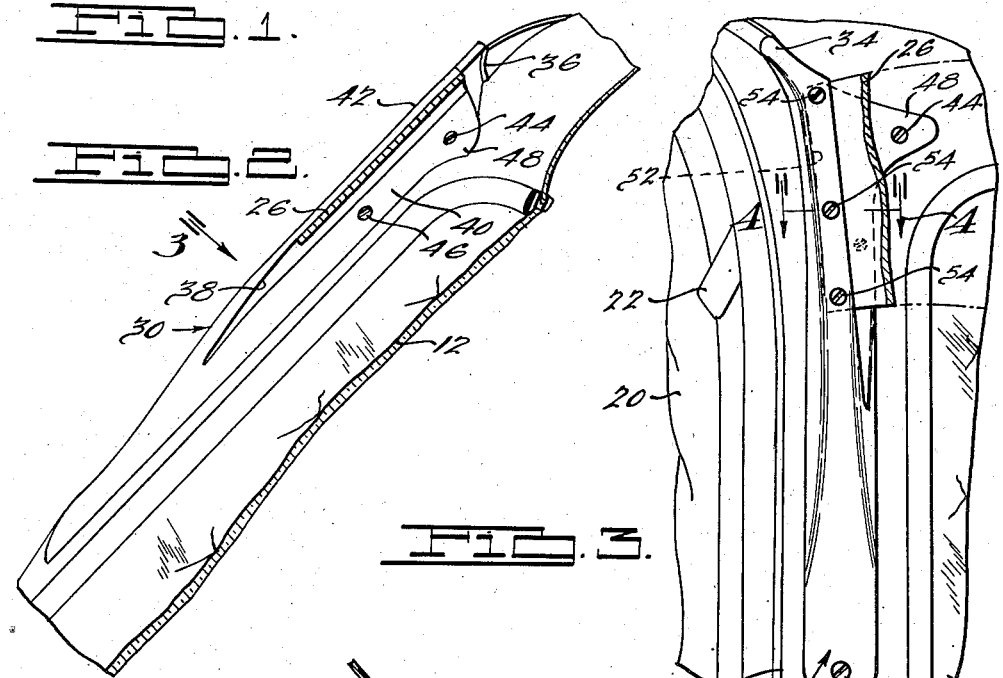
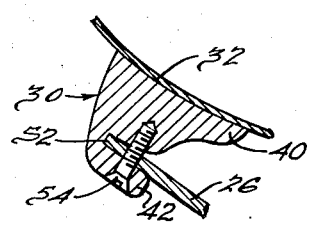
INVENTOR.
William A. Maher.
BY
Harness, Dickey & Pierce
ATTORNEYS.

Patented Oct. 30, 1951

2,573,039

UNITED STATES PATENT OFFICE 2,573,039

COMBINATION DRIP MOLDING AND MOUNTING BRACKET FOR AUTOMOBILE VISORS

William A. Maher, Detroit, Mich.

Application February 24, 1950, Serial No. 146,105

6 Claims. (Cl. 296—95)

This invention relates to a combination drip molding and mounting bracket for an automobile visor.

In certain car models the drip moldings have been shortened at the forward end of the vehicle body. As a result, rain can blow both directly and from the windshield into the wing windows when the latter are open. Also, the shortened drip moldings have made it impossible to mount conventional automobile visors of the type which fasten at the ends thereof to the drip moldings.

An important object of the present invention is to provide a bracket adapted for mounting on the pillars at opposite sides of the windshield, which brackets when so mounted form extensions of the drip moldings and also provide mountings for an automobile visor of the type hereinabove referred to.

Another object of the invention is to provide a bracket of the above-mentioned character that is uniquely formed to enhance the appearance of the vehicle.

Still another object of the invention is to provide a bracket of the above-mentioned character that can be applied to substantially any model car in which the drip moldings have been shortened in the manner described at the forward end of the vehicle body.

Yet another object of the invention is to provide a bracket of the above-mentioned character that serves a double function in the combination of forming an extension for the drip molding and also of providing a mounting for an automobile visor.

Other objects and advantages of the invention will be apparent during the course of the following description.

In the drawing forming a part of this specification and wherein like numerals are employed to designate like parts throughout the same:

Fig. 1 is a fragmentary, perspective view of an automotive vehicle showing brackets embodying the instant invention mounted on the windshield pillars at opposite sides of the vehicle body so as to form extensions of the drip moldings and forming anchoring means for an automobile visor mounted above the windshield;

Fig. 2 is an enlarged, fragmentary, vertical sectional view taken on the line 2—2 of Fig. 1;

Fig. 3 is a fragmentary plan view looking in the direction of the arrow 3 in Fig. 2 and showing parts broken away; and Fig. 4 is a transverse sectional view taken on the line 4—4 of Fig. 3.

In the drawing, wherein for the purpose of illustration is shown a preferred embodiment of the invention, the numeral 10 designates an automobile of conventional construction and current design. The vehicle 10 is provided with the usual windshield 12 having windshield pillars 14 and 16 at opposite sides thereof. At opposite sides of the vehicle body are doors 18 having the usual wing windows 20 pivotally attached in the window opening at 22 according to conventional practice. The vehicle here shown also illustrates a current body design wherein the drip moldings 24 are shortened at the forward end of the vehicle body so that they extend only slightly beyond the rearward edge of the wing windows 20 and above the top of the window. An automobile visor 26 usually sold as a standard accessory is attached along the rearward edge thereof to the vehicle body by brackets 28 and at the ends thereof to the pillars 14 and 16 by brackets 30 embodying the present invention.

As suggested, the shortened drip moldings 24 have caused some trouble during rainy weather in that water running off the roof and blowing from the windshield 12 has access into the vehicle when the wing windows 20 are open. Apparently, this is due primarily to the fact that the drip moldings 24 terminate short of and above the pivots 22. Also, the shortened drip moldings make it difficult to attach visors 26 of the type here shown which conventionally fasten at the ends thereof to the drip moldings.

According to the present invention, all of the above difficulties are obviated by brackets 30 which are uniquely formed and arranged on the vehicle to serve a double function of mounting the ends of the visor 26 and of providing forward extensions of the drip moldings 24. The brackets 30 are uniquely formed so that the ends of the visor 26 are securely fastened and positioned without in any way preventing the brackets from also functioning efficiently as rain guards. In this connection it will be observed that the two brackets 30 are identical except that one is the reverse or mirror image of the other. Accordingly a detailed description of only one bracket is necessary.

The bracket 30 has a transversely concaved undersurface 32 which conforms generally to the shape and contour of the pillar on which it is adapted to be mounted. In this connection it will be observed that the strip 30 extends from the forward end of the drip molding 24 with which it is associated to a point well below the pivot 22 of wing window 20. In fact the strip is formed at the upper end thereof with an obtuse angular extension 34 which is disposed substantially in alignment and in abutting engagement with the forward end of drip molding 24. As perhaps best shown in Fig. 2, the extension 34 is formed with a concaved undersurface 36 which cups or overlaps the drip molding so that the latter extends for a short distance into the extension. In this connection it will be observed that the extension 34 is hollow and that the hollow interior thereof extends into a longitudinal groove 38 which extends downwardly from the top of and is disposed at the inner side of the strip 30. It is significant that the groove 38 extends downwardly to a point well below the hinge 22 so that it, together with the hollow interior of extension 34, constitutes a forward extension of the drip molding 24. This fact, together with the fact that extension 34 fits snugly under the forward end of the drip molding, obviates any possibility of water draining from the top of the vehicle or streaming from the windshield 12 entering the vehicle through the open wing window 20.

In connection wth the foregoing, it will be observed that the longitudinal groove 38 defines lower and upper flanges 40 and 42. The lower flange 40 extends laterally beyond the upper flange 42, and the projecting portion of the lower flange is provided with openings which receive fastening screws 44 and 46. In the particular form of the invention here shown the lower flange 40 is formed at the upper end thereof with a lateral extension or lug 48 which carries the upper fastening screw 44. Fastening screw 46 is positioned below and slightly behind screw 44. To assure secure mounting of the strip 30 a third fastening screw 50 is provided at the lower end thereof. In practice the vehicle body is drilled and tapped prior to mounting the strip 30 and the tapped holes are positioned to coincide exactly with corresponding holes in the strip. Screws 44, 46, and 50 are then inserted and tightened to hold the strip 30 securely on the vehicle. If the undersurface 32 of the strip 30 is properly conformed to the outer surface of the vehicle body it is not necessary to provide additional sealing means between the strip and the body. Consequently, no sealing means are shown in the drawing. However, if for any reason the strip does not conform exactly, a suitable thin gasket of rubber or the like can be inserted between the strip and the body, or the undersurface of the strip can be coated with a suitable mastic or adhesive before applying the same to the vehicle.

It is a feature of this invention that the strip 30 is provided adjacent the upper end and at the outer side thereof with a relatively narrow channel or recess 52 which snugly receives a marginal end portion of the visor 26. In other words, an end portion of the visor 26 extends into and is snugly received by the channel 52. In order to hold the end of the visor solidly attached to the strip 30 so as to prevent vibration and chattering of the visor in use, a plurality of fastening screws 54 extend through the upper flange 42 and are threaded into the portion of the visor received within channel 52. Screws 54 preferably are screwed into the visor so that the latter is pulled solidly against the undersurface of flange 42 when the screws are tightened.

It is a feature of this invention that groove 38 is substantially wider than the thickness of visor 26 (Fig. 2) so that the visor does not obstruct flow of water through the groove. In other words the visor does not completely fill the portion of the groove 38 which it occupies, so water is free to flow from drip molding 24 forwardly along groove 38 and down the body of the vehicle. At the same time, the end of the visor is securely anchored to the body of the vehicle by the strip 30.

It may thus be seen that I have achieved the objects of my invention. I have provided a molding strip 30 that can be easily and quickly fastened to vehicle bodies of the type here under consideration. When fastened to the body the strips 30 serve a double function in the combination of providing a forward extension for the drip moldings 24 and also of providing a convenient means for fastening the ends of the visor 26. The strips 30 are uniquely constructed to hold the ends of the visor solidly so that it will not chatter or vibrate due to wind pressure when the vehicle is traveling at high speed, and the visor is positioned in such manner that it in no way obstructs or interferes with the flow of water from the drip moldings 24 along the grooves 38 which constitutes the forward extension of the moldings. Also, the grooves 38 extend substantially below the pivot points 22 of wing windows 20 so that water streaming across the windshield 12 will be retained by grooves 38 and directed away from the wing windows 20.

While the strips 30 can be made of any suitable material they preferably are made of metal which conveniently can be chrome finished. When fastened to the vehicle body in the manner described the strips 30 have a neat, streamlined appearance and materially enhance the general appearance of the vehicle.

Having thus described the invention, I claim:

1. A combination drip molding and mounting bracket for an automobile visor adapted to be mounted on the windshield pillar and in front of the wing window of an automotive vehicle comprising an elongated molding strip mountable on the windshield pillar and having a longitudinal groove at the inner side thereof extending to a point below the hinge pivot of said wing window, said strip having a hollow extension at the upper end thereof disposed at an obtuse angle to the body of the strip to align with and overlap the forward end of the drip molding so as to direct flow from the molding into the longitudinal groove of the strip, said groove also adapted to receive the terminal portion of the visor and being substantially wider than the thickness of the visor so that the latter does not appreciably obstruct flow through the groove.

2. A combination drip molding and mounting bracket for an automobile visor adapted to be mounted on the windshield pillar and in front of the wing window of an automotive vehicle comprising an elongated molding strip mountable on the windshield pillar and having a longitudinal groove at the inner side thereof extending to a point below the hinge pivot of said wing window, said strip having a hollow extension on the upper end thereof disposed at an obtuse angle to the body of the strip to align with and overlap the forward end of the drip molding so as to direct flow from the molding into the longitudinal groove of the strip, said groove also provided adjacent the upper end and at the outer side thereof with a relatively deep narrow channel, said channel adapted to receive the marginal end of the visor and to hold the same spaced above the bottom of the groove so that the visor does not appreciably obstruct flow through the groove.

3. A combination drip molding and mounting bracket for an automobile visor adapted to be mounted on the windshield pillar and in front of the wing window of an automotive vehicle comprising an elongated molding strip mountable on the windshield pillar and having a longitudinal groove at the inner side thereof extending from the top of the strip to a point below the hinge pivot of said wing window and defining upper and lower flange portions, the lower flange portion extending laterally inwardly beyond the upper flange portion and the extending portions of said lower flange being provided with openings adapted to receive fastening screws to attach the strip to the vehicle, said strip also having a hollow extension on the upper end thereof disposed at an obtuse angle to the body of the strip to align with and overlap the forward end of the drip molding so as to direct flow from the molding into the longitudinal groove of the strip, said groove also adapted to receive the terminal portion of the visor and being substantially wider than the thickness of the visor so that the latter does not appreciably obstruct flow through the groove.

4. A combination drip molding and mounting bracket for an automobile visor adapted to be mounted on the windshield pillar and in front of the wing window of an automotive vehicle comprising an elongated molding strip mountable on the windshield pillar and having a longitudinal groove at the inner side thereof extending from the top of the strip to a point below the hinge pivot of said wing window and defining upper and lower flange portions, the lower flange portion extending laterally inwardly beyond the upper flange portion and the projecting portion of said lower flange being provided with openings adapted to receive fastening screws to attach the strip to the vehicle, said strip also having a hollow extension on the upper end thereof disposed at an obtuse angle to the body of the strip to align with and overlap the forward end of the drip molding so as to direct flow from the molding into the longitudinal groove of the strip and a relatively deep narrow recess adjacent the upper end and at the outer side of said groove, said recess adapted to receive and snugly fit an outer marginal edge of the visor and to hold the same spaced substantially above the bottom of the groove so as not to appreciably obstruct flow through the groove, said strip having apertures opening into said recess for reception of screws to fasten the visor securely in said recess.

5. An elongated molding strip mountable on the windshield pillar of an automotive vehicle, said strip having a longitudinal groove at the inner side thereof and an angular hollow extension on the upper end thereof formed with a concave inner surface, said groove having a relatively deep narrow recess adjacent the upper end thereof for receiving the marginal end of an automobile visor.

6. An elongated molding strip mountable on the windshield pillar of an automotive vehicle, said strip having a longitudinal groove in one side thereof for receiving the marginal end of an automobile visor and provided at one end thereof with a hollow extension disposed at an obtuse angle to the body of the strip and arranged to overlap the drip molding of the vehicle.

WILLIAM A. MAHER.

REFERENCES CITED

The following references are of record in the file of this patent:

UNITED STATES PATENTS

| Number | Name | Date |
|---|---|---|
| 2,497,050 | Thibault | Feb. 7, 1950 |
| 2,500,406 | Greenfield | Mar. 14, 1950 |
| 2,511,401 | Ellithorpe | June 13, 1950 |
| 2,541,271 | Mueller et al. | Feb. 13, 1951 |